United States Patent [19]

Olmer

[11] Patent Number: 5,193,215
[45] Date of Patent: Mar. 9, 1993

[54] LOCATION SIGNALLING DEVICE FOR AUTOMATICALLY PLACING A RADIO DISTRESS CALL

[76] Inventor: Anthony L. Olmer, 1435 Bedford St., Apt. 6-E, Stamford, Conn. 06905

[21] Appl. No.: 470,267

[22] Filed: Jan. 25, 1990

[51] Int. Cl.$^5$ .................. H04B 7/00; H04B 1/034; G08G 1/123
[52] U.S. Cl. ...................... 455/66; 455/95; 342/389; 340/996; 364/449
[58] Field of Search ............... 364/449, 461; 340/692, 340/568, 573, 991, 992, 993, 994, 996; 381/31, 51; 455/73, 74, 78, 79, 89, 66, 67, 83, 95; 342/389, 410, 413, 455, 388, 386, 387, 407

[56] References Cited

U.S. PATENT DOCUMENTS

| | | | |
|---|---|---|---|
| 3,711,856 | 1/1973 | Adrian et al. | 342/388 |
| 4,196,474 | 4/1980 | Buchanan et al. | 364/461 |
| 4,267,597 | 5/1981 | Volpi et al. | 455/79 |
| 4,310,923 | 1/1982 | Kennedy | 455/89 |
| 4,701,955 | 10/1987 | Taguchi | 381/51 |
| 4,713,767 | 12/1987 | Sato et al. | 340/993 |
| 4,742,514 | 5/1988 | Goode et al. | 455/54 |
| 4,791,572 | 12/1988 | Green, III et al. | 340/993 |
| 4,833,477 | 5/1989 | Tendler | 340/996 |
| 4,893,127 | 1/1990 | Clark et al. | 342/386 |

*Primary Examiner*—Reinhard J. Eisenzopf
*Assistant Examiner*—Lisa Charouel
*Attorney, Agent, or Firm*—Ostrager & Chong

[57] ABSTRACT

A location signalling device sends a radio distress call giving the precise location coordinates of a person in distress automatically once it is activated without the need for anyone to operate an associated radio transmitter. The device includes a microprocessor controller, a digital location data input, a keyboard, a voice input, an LCD display, a clock/timer, a digital memory, and a voice synthesizer output which provides the distress call in audio voice signals to the microphone input of the radio transmitter when an activating switch is pressed.

12 Claims, 2 Drawing Sheets

LOCATION SIGNALLING DEVICE FOR AUTOMATICALLY PLACING A RADIO DISTRESS CALL

FIELD OF THE INVENTION

This invention generally relates to a location signalling device, and more particularly, to one adapted for use in emergency rescue conditions.

BACKGROUND ART

For persons on a boat or travelling in remote locations, it is important to have a means of signalling one's location in emergency conditions so that rescue can be effected as promptly as possible even if such persons become incapacitated or preoccupied with survival efforts. In conventional equipment for use on water, a distress or "Mayday" call is sent by shipboard radio transmission to another ship or to a shore receiver. The recipient of the distress call typically answers and requests the sender's location coordinates. The sender must then give the coordinates over the radio, often for several times. A clear and effective transmission of the location coordinates is often not possible under conditions of extreme duress, for example, when a boat is sinking or capsized or on fire, or when the occupants are otherwise forced to abandon ship.

Conventional rescue equipment includes portable radio transmitters which are activated by persons in distress to intermittently emit a radio distress signal. However, such transmitters often do not effect a prompt rescue since the signal may not be powerful enough to reach a receiver, and they do not broadcast the location coordinates, thereby requiring the probable area of rescue to be searched in order to visually pinpoint the location of the victims.

SUMMARY OF THE INVENTION

Accordingly, it is a principal object of the invention to provide a location signalling device which will send a radio distress call giving the precise location coordinates of a person in distress automatically once it is activated without the need for anyone to operate the radio transmitter and give the coordinates. It is a particular object of the invention that the device be activated by a single switch to give the coordinates without the need for further intervention from the persons in distress.

In accordance with the invention, a location signalling device for use in combination with a radio transmitter having a transmitter input comprises: a device input for entering location data; a memory for storing the entered location data; a device output including an output terminal connected to the transmitter input of the radio transmitter for automatically retrieving the location data stored in memory and sending them to the input of the radio transmitter in response to an activation signal; and activation means for providing the acitvation signal to said device output means in response to an actuating action by a user when a distress call is to be sent.

In the preferred embodiment, the location signalling device, adapted for shipboard use, includes a controller, an input for receiving coordinate location data from a coordinate computing device, a keyboard for entering digital location data manually, a microphone and vocoder for entering voice input representing location data and converting it into digital voice data, a display for visual verification of entered digital location data, a digital memory for storing the entered location data and voice data according to data type and in order of time priority, a D/A converter for converting digital location data into audio voice signals, a voice synthesizer for converting the digital voice data into audio voice signals, and output means for sending the audio voice signals to the microphone input of the shipboard radio transmitter.

Other objects, features, and advantages of the present invention are described below in conjunction with the drawings, as follows:

DESCRIPTION OF THE PREFERRED EMBODIMENTS

A preferred embodiment of the invention is described below for use in combination with a conventional radio transmitter as used on ships and boats. However, it is to be understood that the invention is not limited to use in the nautical environment, but may be used in any remote location where an operable radio transmitter is present including, for example, portable radio packs for airborne, alpine, or land use, or even stationary radio transmitters located in remote locations.

Figure 1:
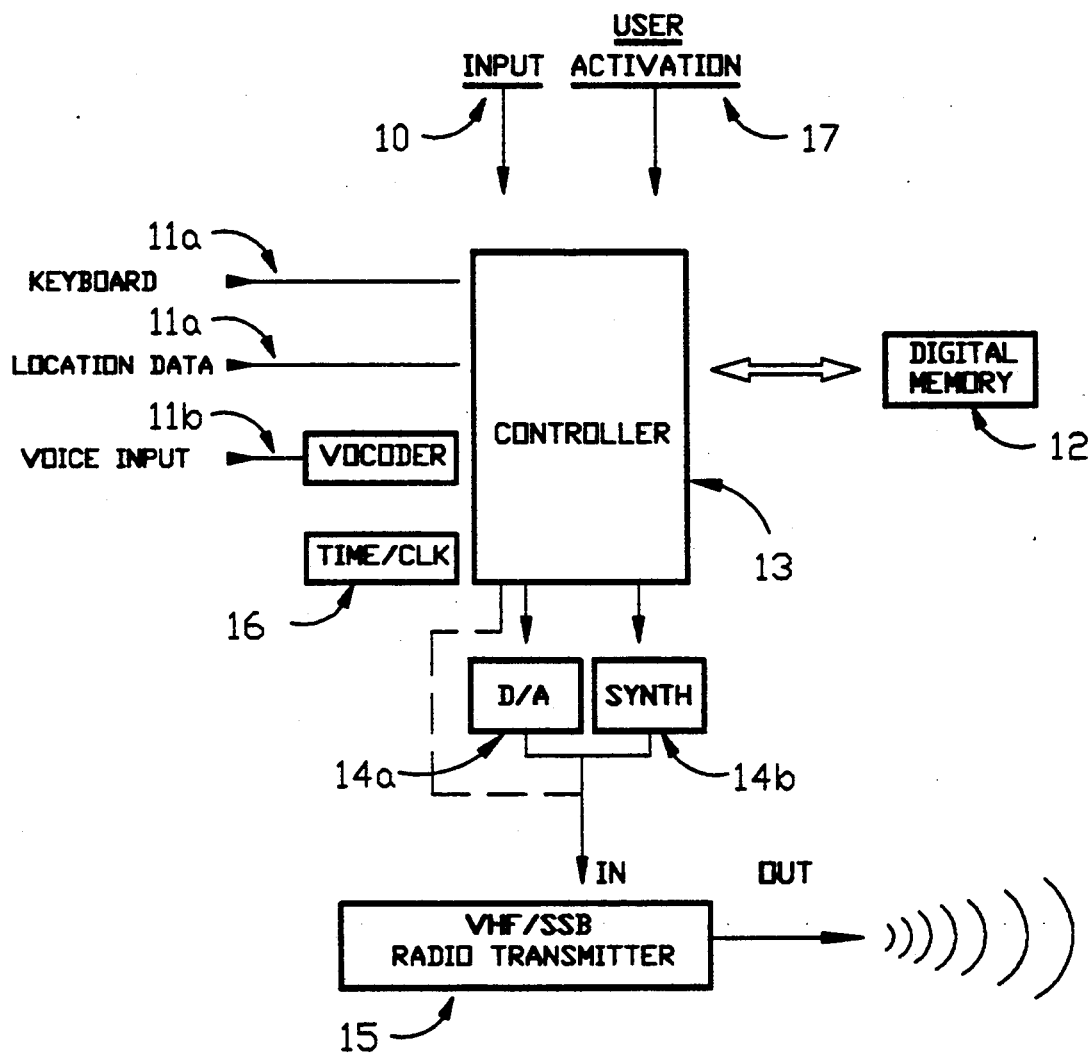
FIG. 1 is a schematic diagram of a location signalling device in accordance with the invention.

Referring to FIG. 1, a schematic diagram of the basic operation of the device is shown having a device input 10 for receiving input location data in any form, e.g. manual keyed-in digital data, digital coordinate data, voice input, etc. If the input signal is a voice input, it is converted to digitized form by vocoder 11b, otherwise it is passed through as digital data as indicated by 11a. The digital data is processed by a controller 13 and stored in a digital memory 12. The controller is preferably a microprocessor unit which executes a stored operations programs for periodically entering and updating location data, and sending distress calls when the device is activated. Such microprocessor units are widely used and are commercially available. the operations program is stored in a ROM memory, and a RAM memory is used to store the location data. The RAM memory can be selected to have of sufficient capacity, or a permanent memory unit can be added, to store the entered location data for an entire trip if it is desired to create the electronic equivalent of a ship's log.

The controller flags or addresses the memory 12 depending on whether the data is digital location data or voice data, and also depending on priority of time. For example, if the location data is entered from the keyboard, separate keycodes are used to identify the type of location data (latitude, longitude, bearing, speed) followed by keyed-in digital numbers. If the location data is entered from a LORAN computing device, such as the commercially available LORAN 1083 Dataport, the controller adds in the appropriate location data type identifiers and converts the LORAN data into its digital number equivalent (direction, degrees, seconds). Location data may also be entered from other devices which can locate a ship's coordinate position, such as Sat Nav (Satellite Navigation) or GPS (Global Positioning System). If the location data is entered as keycodes identifying the type of location data followed by numbers read-in by voice, the controller converts the identifiers into their corresponding digitized voice equivalent and stores them and the digitized voice input from the vocoder 11b as separate digital voice data in the memory 12. The controller also analyzes the location data type identifiers and stores flags or pointers to the entered data as the most recent entry for each location data type. Thus, the most current location data is always maintained in memory no matter which input source the data is entered through.

The controller and digital memory are also used to establish and store other information for a distress call, e.g. distress call words or phrases, the ship's name, ID number and/or description, the number of persons to be rescued, the current time, date, etc. The distress call words or phrases, ship's name, ID number and/or description can be pre-established in the device or entered as voice input in the user's own voice. The current time and date can be automatically input from a timer/clock 16 or entered manually from the keyboard.

An activation signal 17 is provided to the controller upon actuation by the user, for example, by a single switch or push-button, when an emergency condition has occurred which requires a distress call to be sent. The controller automatically causes the distress call information and most current location data to be read out from the memory 12. The distress call information and location data are converted to audio voice signals by the D/A converter 14a, if stored in digitized voice form, or synthesized into audio voice signals by the voice synthesizer 14b, if stored in digital data form. The audio voice signals are the analog signals corresponding to the spoken distress call and location data, and are fed to the microphone input line of the radio transmitter 15, from which they are transmitted as radio signals.

The controller can be set to repeat the distress call periodically, e.g. every few minutes, so that no further action is required by the user if the occupants have abandoned ship or are pre-occupied with survival conditions. The controller 13 can also provide an ON/OFF signal (indicated by the dashed lines) to turn the radio transmitter on and off automatically with each transmission, so that the user does not have to operate the radio, and the radio stays open for receiving a reply in between distress calls.

The above-described rescue device allows entry of the location data from different sources so that the user can take the most convenient option of having an automatic backup. For example, during the long hours of normal sailing, it may not be convenient for the user to continually update the location coordinates. Thus, location data can be automatically input from a LORAN, Sat Nav, GPS, or other location computing device periodically, such as every half hour. The user may also key-in the coordinate data from the keyboard of the device if the coordinates are to be updated between or to override the location data readings. Further, the user can input the coordinates orally through a microphone input, for example, if an emergency condition arises and the user knows the most current coordinates.

Figure 2:
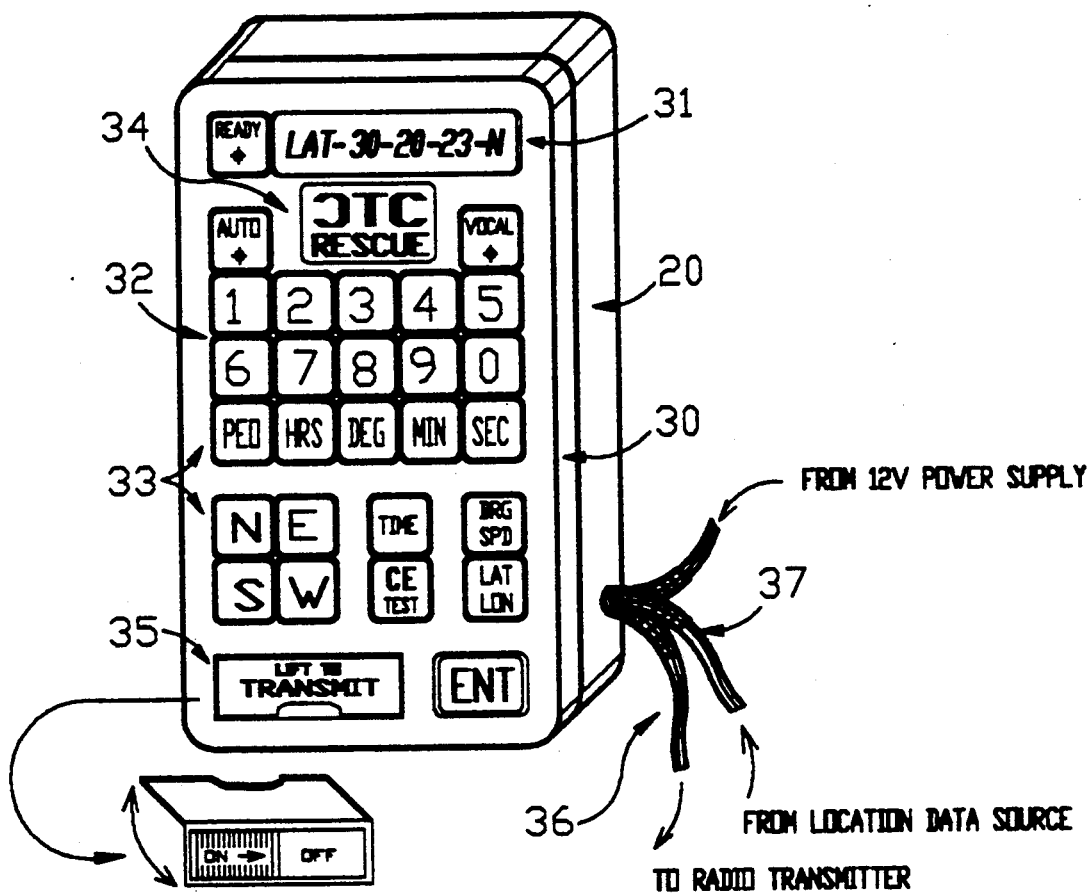
FIG. 2 is a drawing of one example of a rescue pack and console for the location signalling device.

FIG. 2 shows one version of a rescue pack 20 which incorporates the invention having a console 30, including an LCD display 31, numerical keyboard 32, function keys 33, a microphone input 34, and a switch 35 for activating the rescue pack to perform its automatic calling functions. The function keys are used to identify the distress information or location data type being entered through the keyboard or the microphone input. A protective hinged lid may be provided over the switch 35 to prevent accidental activation. An output line 36 is used to send audio voice signals to a radio transmitter, and an input line 37 is used to provide location data input from a location computing device.

Figure 3:
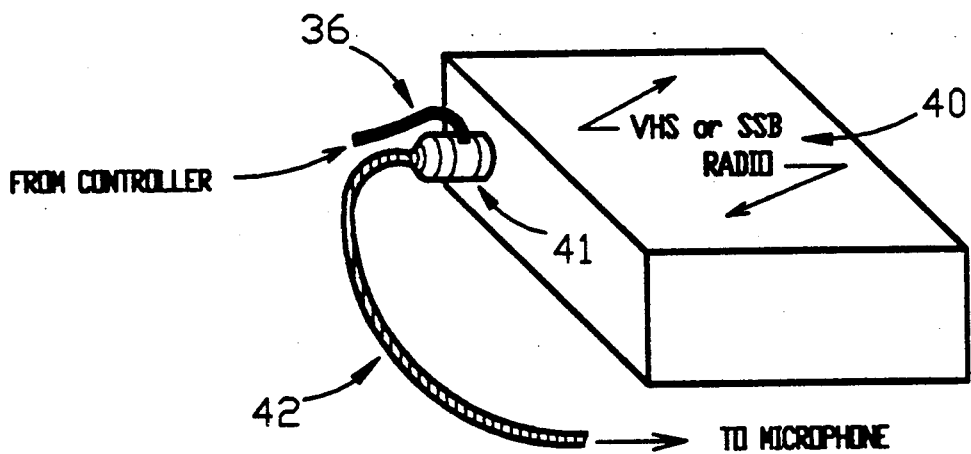
FIG. 3 shows the connections of the rescue pack to an associated radio transmitter.

As shown in FIG. 3, the output line 36 from the rescue pack 20 is connected to the input of a radio transmitter unit 40, such as a VHF or SSB radio. The output line 36 is tapped into the conventional microphone input line 42 for the radio through an adapter plug 41, in order to allow the rescue pack to be conveniently connected to the standard microphone jack of conventional radio units. The adapter tap ensures that the rescue pack is always in a ready state to transmit a distress call without having to reconnect the standard microphone to the radio for normal transmissions. The radio is powered by connection to the ship's power source and to the rescue pack for backup power. The rescue pack is also connected to the ship's source of power as well as carries its own batteries internally. If the ship's power goes out, the batteries of the rescue pack will power the rescue pack and the radio for a sufficient period of time to send the distress calls.

A typical distress message may consist of the following elements entered from the indicated input sources:

MAYDAY—MAYDAY—MAYDAY (Ship's name, type, and/or ID)—Voice input (Distress condition, if stored)—Voice input (Number of persons on board, if stored)—Keycodes+numbers (Time and date)—Clock, or Keycodes+numbers (Latitude and longitude)—Data, Voice, or Keycodes+numbers (Bearing and speed, if stored)—Voice, or Keycodes+numbers (End of message)

The preferred operation of the rescue pack will now be described. When the AUTO function key is pressed, the rescue pack is set to the automatic mode in which coordinate data is periodically read in from a coordinate location computer. The time and date is periodically updated from the rescue pack's internal timer/clock. The ship's name, type, and ID number has been stored upon initial installation of the rescue pack. When the activation switch 35 is pushed, the rescue pack controller reads out the standard distress message, stored information, time and date, and last-entered coordinates and any other location data. The message is repeated periodically, for example, every several minutes then at longer intervals thereafter, until the switch is turned OFF or the battery power is consumed. The length, timing, and repetition of messages is selected in accordance with standard rescue convention.

In the program mode, set by the PROG function key, the rescue pack is to be manually programmed. The controller executes a stored operations program to cause a prompt for each data type to be displayed in sequence on the LCD display 31. The user keys in the number of persons to be rescued, the current time and date, the current coordinates, and/or the current bearing and speed of the vessel, if known. Alternatively, the user can enter the data orally by pressing the VOC key, and speaking into the built-in microphone 34. The voice input is then digitized by the vocoder 11b and stored in the digital memory in digitized form. As each data type is entered, the user presses the ENT key to store the data. If the entry is incorrect, the CE key is pressed to clear the error, and a new entry is made. The user can override the programmed prompts by pressing the appropriate function key and entering the data directly (PER, TIME, BRG/SPD, LAT/LONG). The currently entered data are stored for output as the distress message until updated again either manually or automatically.

Numerous modifications and variations are of course possible in light of the principles of the invention disclosed above. For example, the rescue pack and radio may be incorporated into a single portable unit which can be dispensed at the rescue site or carried. The internal components of the rescue pack may be implemented as discrete elements or in IC circuitry. Other data functions and distress message elements may of course be employed. All such modifications and variations are intended to be included within the spirit and scope of the invention, as defined in the following claims.

I claim:

1. A location signalling device for use in combination with a coordinate location data generating unit and a radio transmitter having a transmitter input, comprising:
    a device input/output port for communicating with the coordinate location data generating unit and entering location data provided from the coordinate location data generating unit into the location signalling device;
    a memory for storing the entered coordinate location data;
    a timer/clock having periodic time setting means for setting predetermined periodic time intervals for entering coordinate location data;
    a device controller coupled to said device input/output port, said timer/clock, and said memory, including a microprocessor having programmed location data updating means for automatically communicating with the coordinate location at a generating unit to provide current coordinate location data at the predetermined periodic time intervals set by said timer/clock and storing current location data entries in said memory in order as to time of entry;
    a device output including an output terminal connected to the transmitter input of the radio transmitter for automatically retrieving a most current entry of the location data stored in memory and sending said most current location data to the input of the radio transmitter in response to a distress activation signal; and
    activation means for providing the activation signal to said device output means in response to an actuating action by a user when a distress call is to be sent.

2. A location signalling device according to claim 1, wherein said memory is a digital memory for storing entered data in digital form.

3. A location signalling device according to claim 2, wherein said device input includes a keyboard for entering digital location data manually.

4. A location signalling device according to claim 2, wherein said device input includes a microphone and a vocoder for entering voice input representing location data and converting it into digitized voice data.

5. A location signalling device according to claim 1, further comprising a display for visual verification of entered data.

6. A location signalling device according to claim 2, wherein said device output includes a D/A converter for converting the digital location data into audio voice signals.

7. A location signalling device according to claim 4, wherein said device output includes a voice synthesizer for converting the digitized voice data into audio voice signals.

8. A location signalling device according to claim 7, wherein said device output includes an output line from said output terminal and an adapter for tapping said output line into a standard microphone input line of a radio transmitter.

9. A location signalling device according to claim 2, wherein said activation means includes a ON/OFF switch and a hinged protective lid for preventing accidental actuation of said switch.

10. A location signalling device according to claim 1, further including power source means including power leads for connection to an external power source, and a battery supply as a backup power source.

11. A location signalling device according to claim 1 wherein said radio transmitter is a VHF or SSB radio transmitter having a standard microphone line input.

12. A location signalling device according to claim 2, wherein said digital memory is provided with sufficient capacity to store an entire series of entered location data for a trip.

* * * * *